United States Patent [19]
Paxton

[11] 3,750,803
[45] Aug. 7, 1973

[54] RAPID TRANSPORTATION SYSTEM
[76] Inventor: Lee C. Paxton, 5016 Bremner Ct. No. 4, Sacramento, Calif. 95841
[22] Filed: Nov. 11, 1971
[21] Appl. No.: 197,651

[52] U.S. Cl....... 214/38 CC, 104/130, 104/148 MS, 105/368 R
[51] Int. Cl.................. B60l 13/00, B65g 67/02
[58] Field of Search............ 104/148 LM, 148 MS; 318/135; 105/366 R

[56] References Cited
UNITED STATES PATENTS
| | | | |
|---|---|---|---|
| 3,638,093 | 1/1972 | Ross | 318/135 X |
| 3,594,622 | 7/1971 | Inagaki | 318/135 |
| 3,167,168 | 1/1965 | Park | 104/148 LM |
| 3,144,838 | 8/1964 | Shaver et al. | 105/366 R |

Primary Examiner—Gerald M. Forlenza
Assistant Examiner—George H. Libman
Attorney—Alexander B. Blair

[57] ABSTRACT

A rapid transportation system which includes a channel trackway with electromagnets positioned therealong. The magnets are individually energizable and are arranged to support and propel the pallets associated therewith. The pallets are arranged to support a motor vehicle, a passenger pod, a freight pod, or a work pod. The magnets of the trackway are used to divert a pallet from the main trackway to adjacent trackways such as a station or depot through a switch having no moving parts. A mechanical diverter is provided for preventing a pallet from becoming lodged in a partially switched condition to thereby tie-up the system.

13 Claims, 40 Drawing Figures

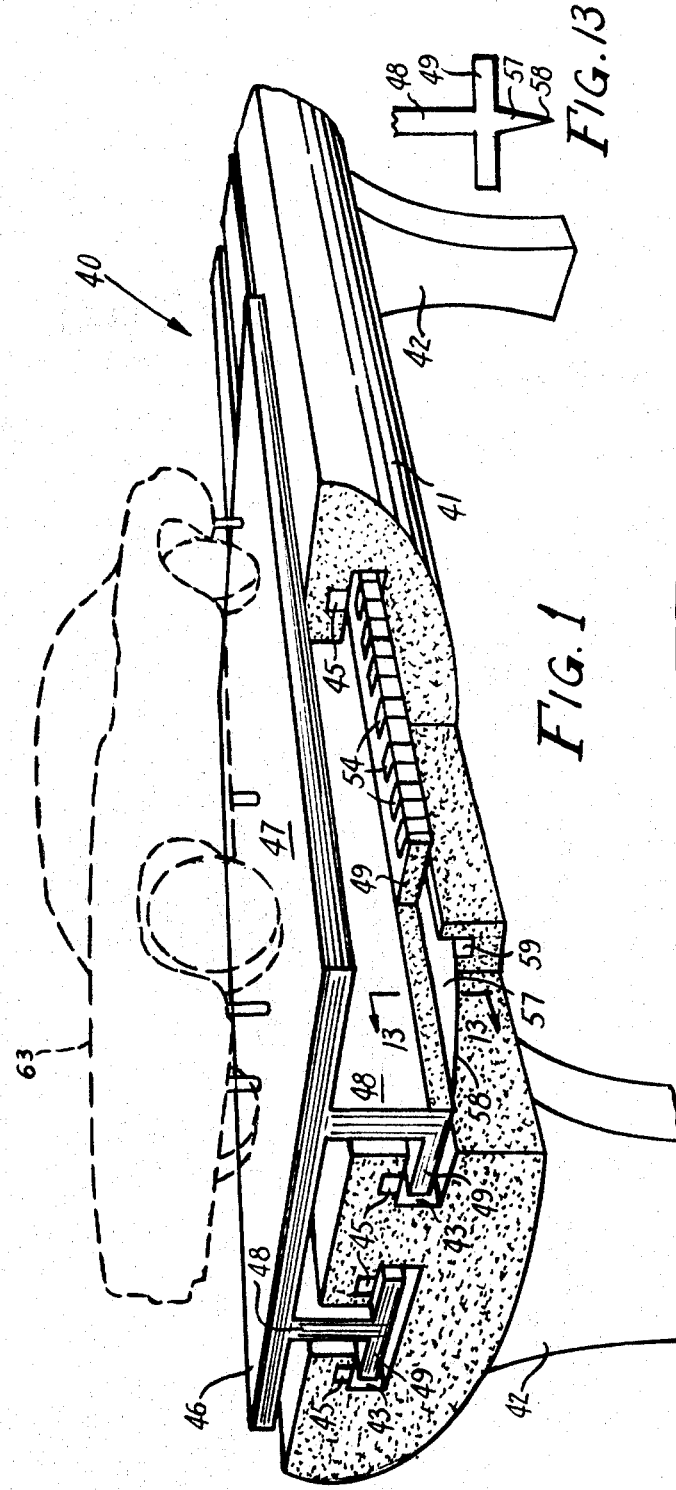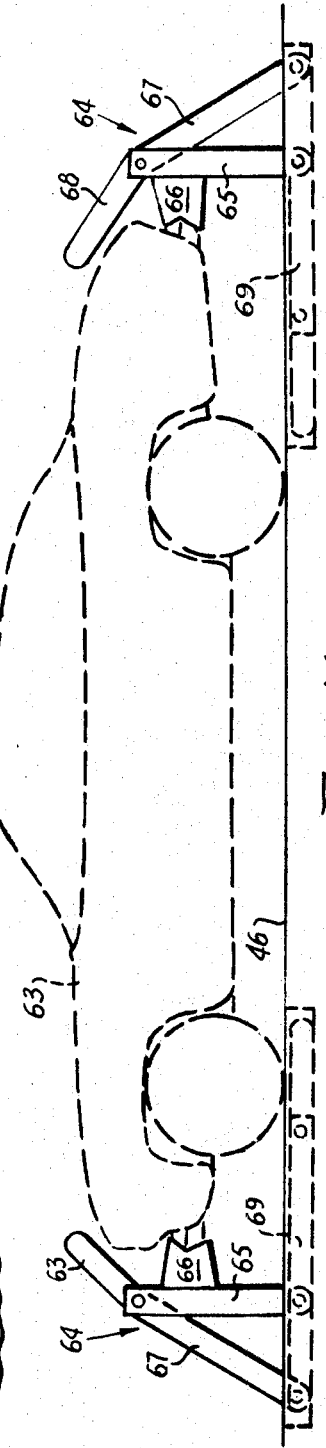

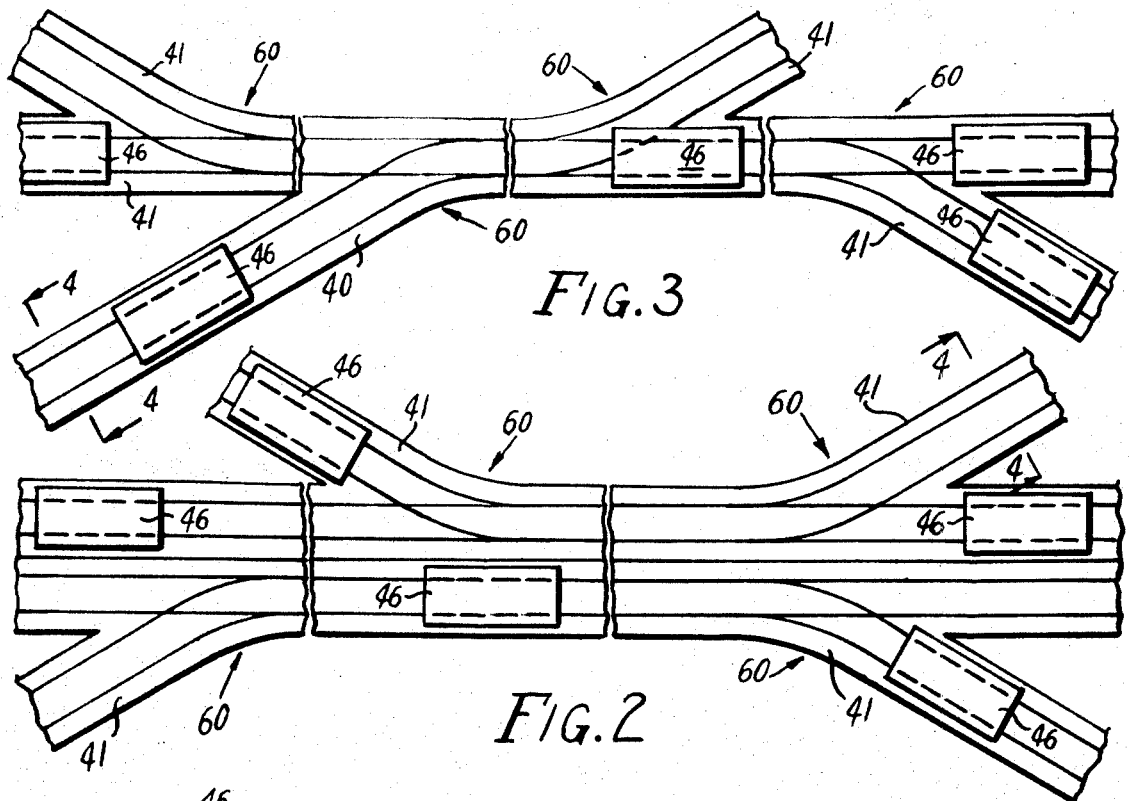
FIG. 3
FIG. 2
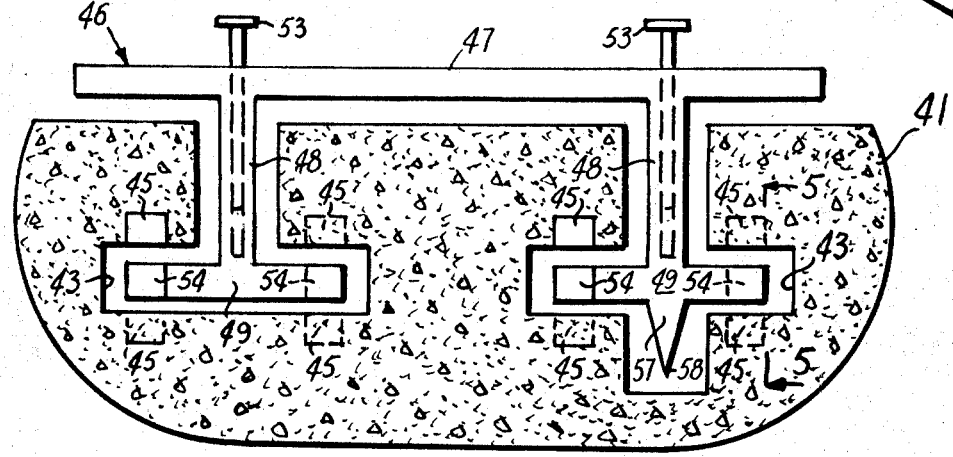
FIG. 4
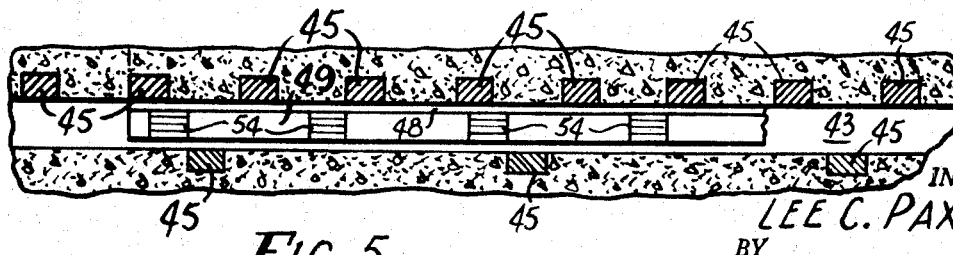
FIG. 5
INVENTOR.
LEE C. PAXTON
BY
Alexander R. Blair
ATTORNEY.

INVENTOR.
LEE C. PAXTON
BY
Alexander R. Blair
ATTORNEY.

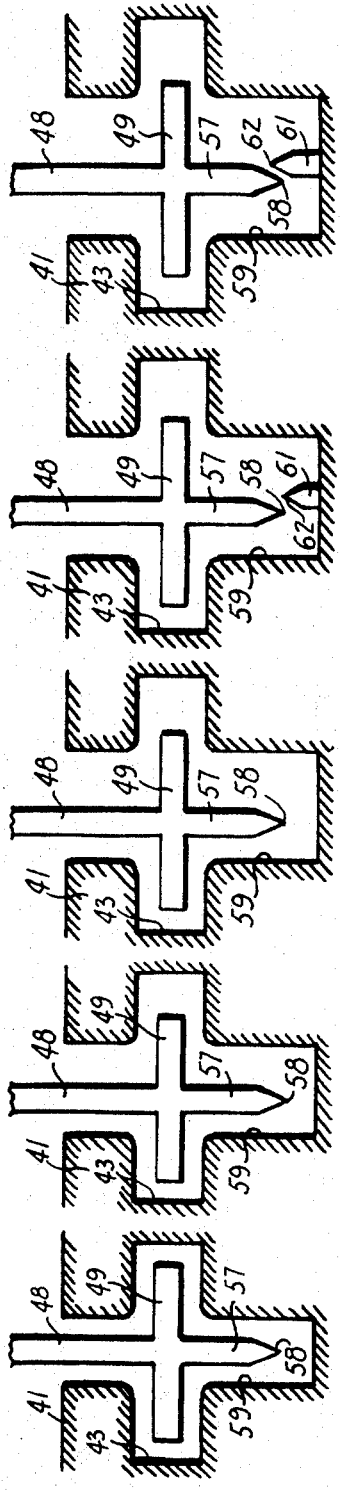
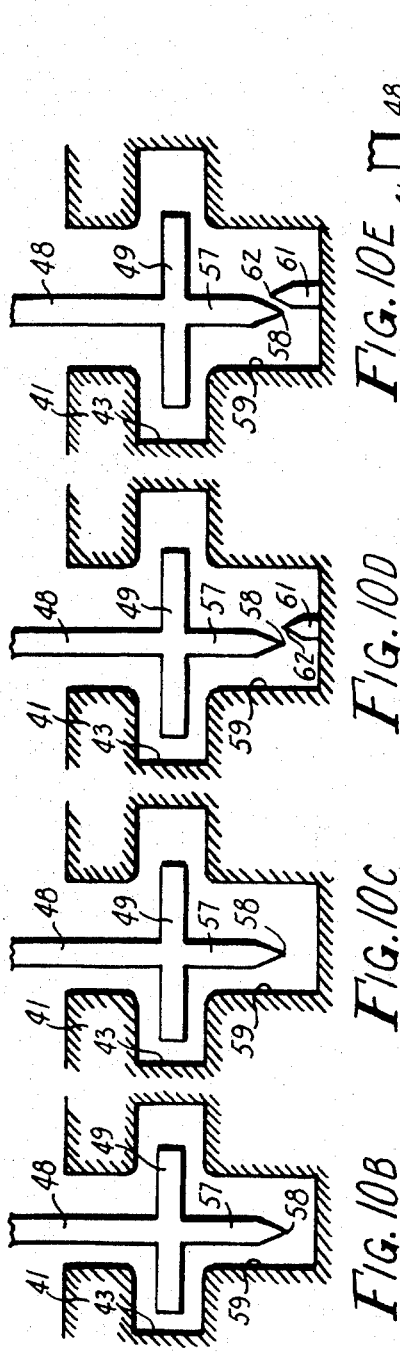
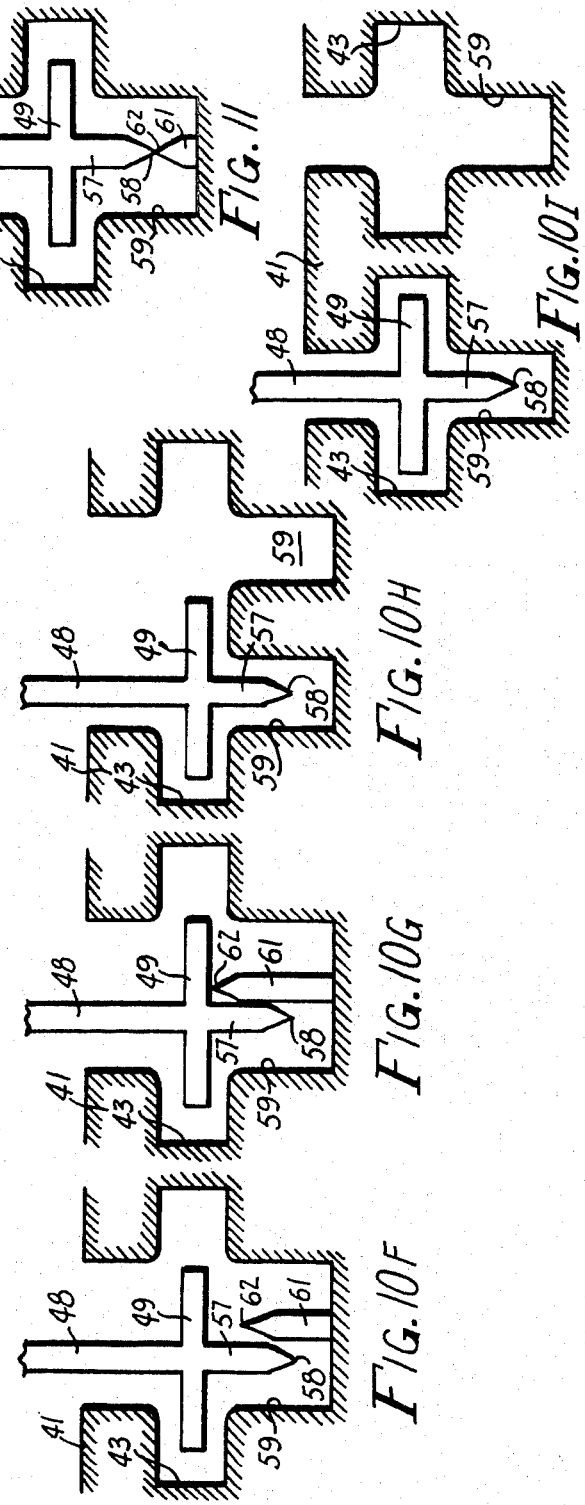

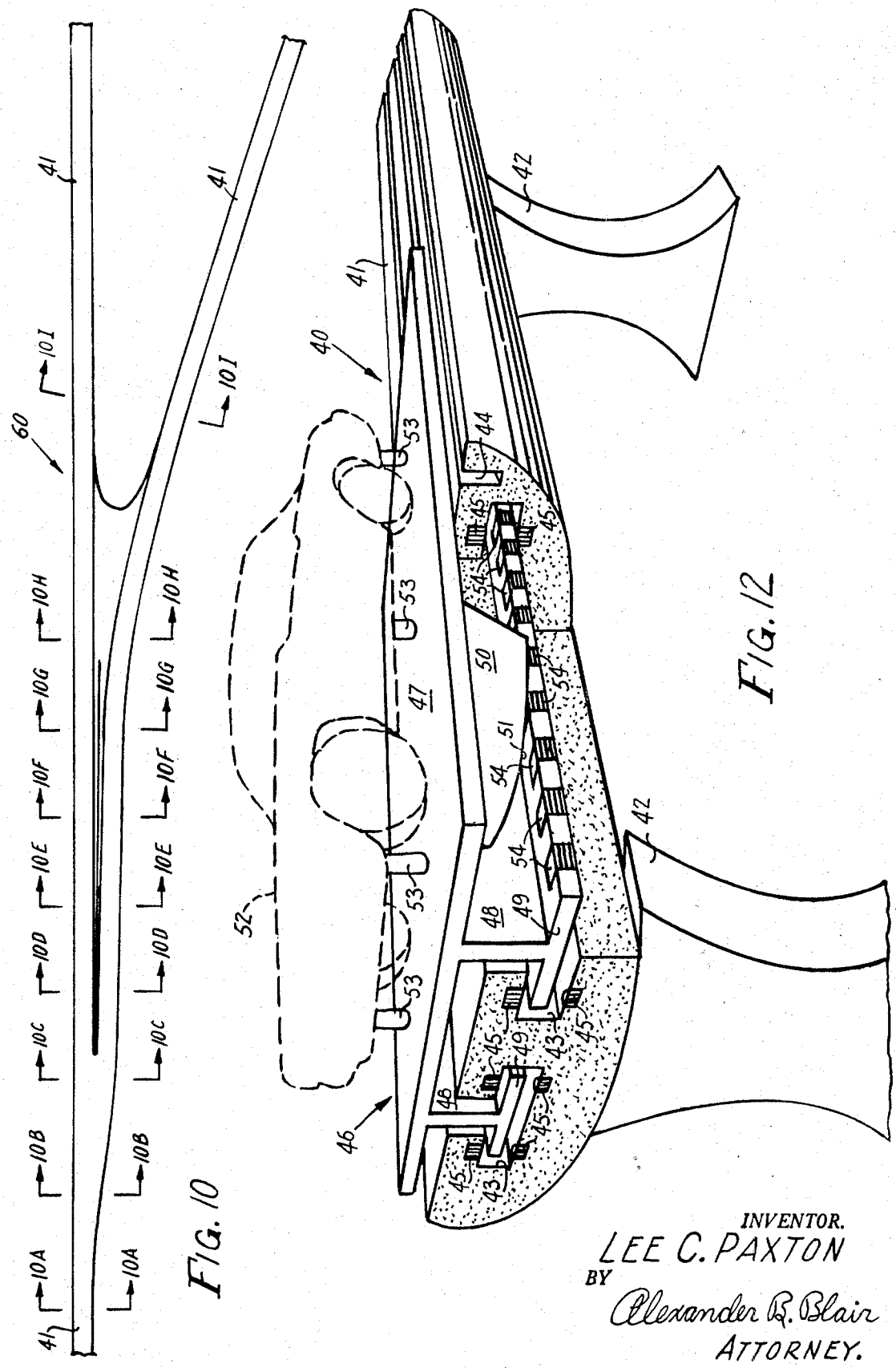

INVENTOR.
LEE C. PAXTON
BY
Alexander R. Blair
ATTORNEY.

INVENTOR.
LEE C. PAXTON
BY
Alexander B. Blair
ATTORNEY.

INVENTOR.
LEE C. PAXTON
BY
Alexander R. Blair
ATTORNEY.

INVENTOR.
LEE C. PAXTON
BY
Alexander B. Blair
ATTORNEY.

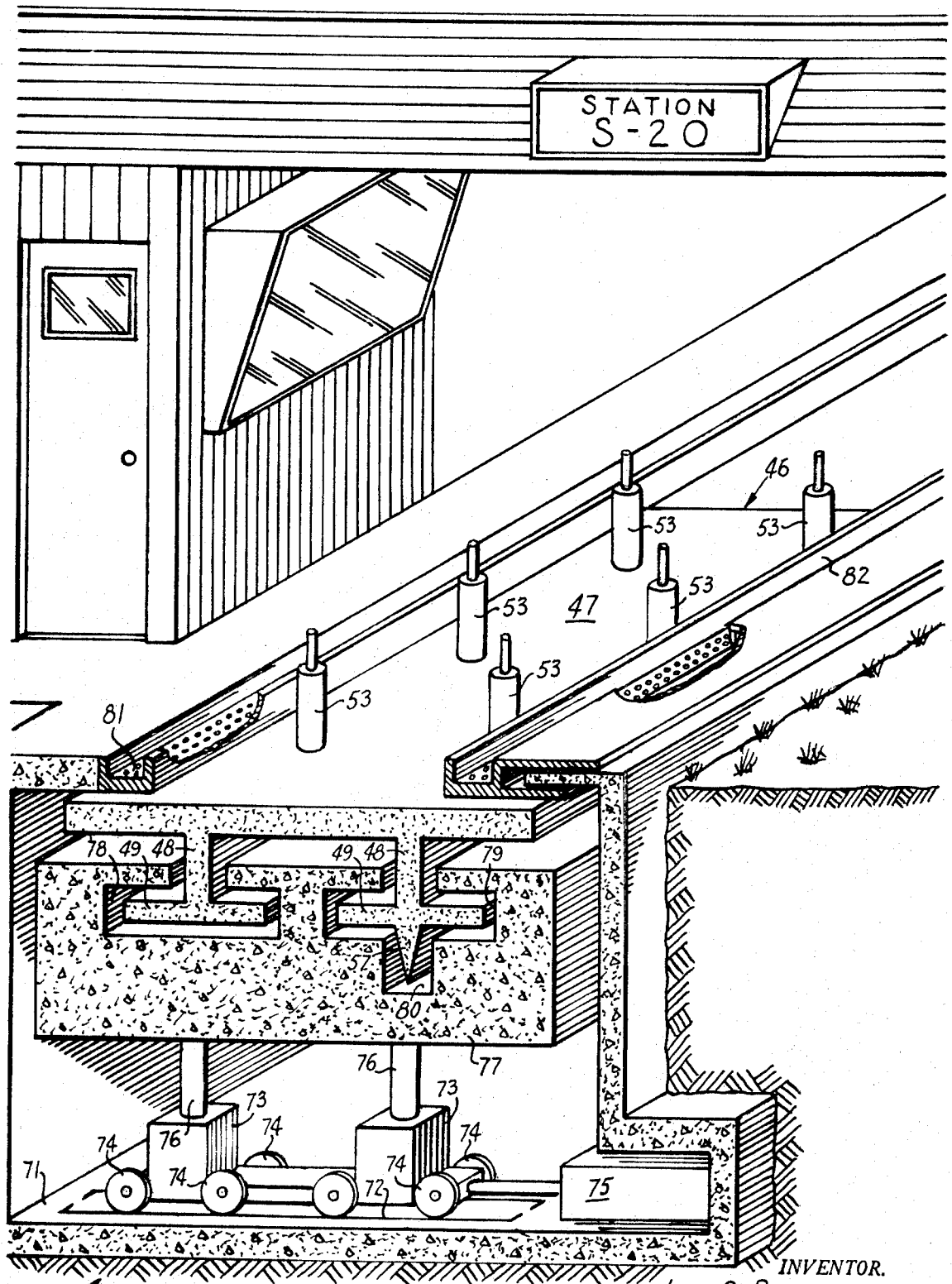

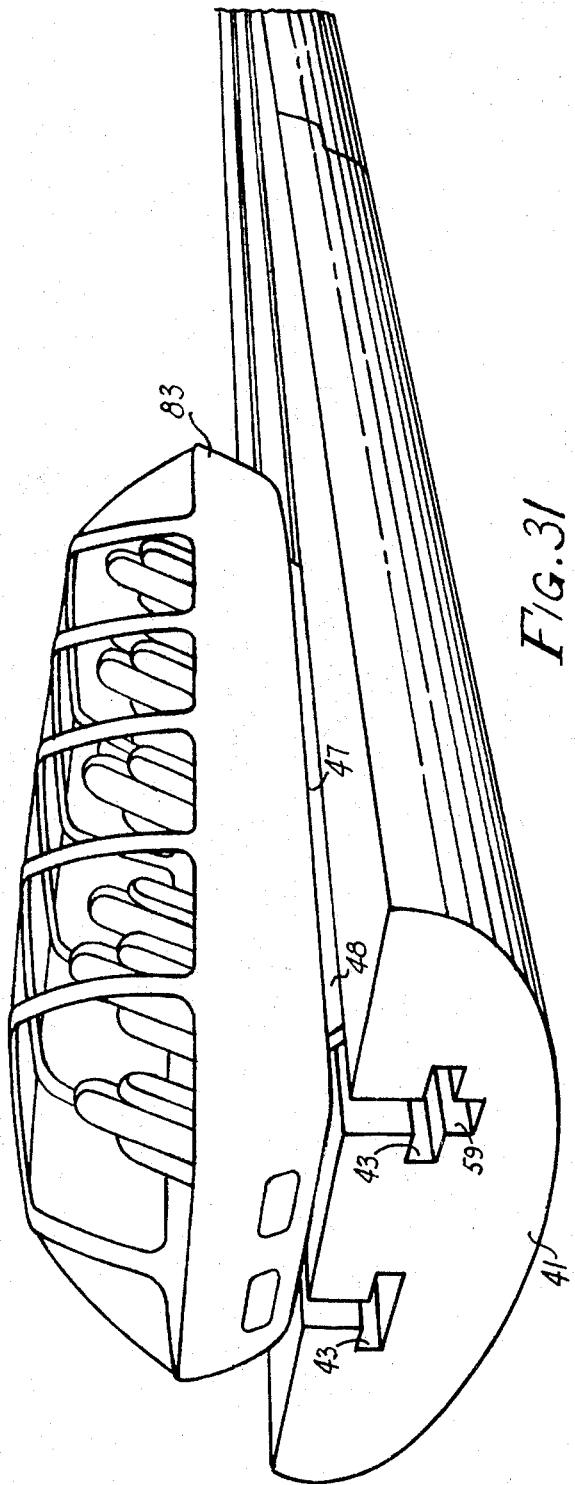

RAPID TRANSPORTATION SYSTEM

BACKGROUND OF THE INVENTION

FIELD OF THE INVENTION

The present invention relates to a rapid transit system in which both the support and propulsion of the vehicles are obtained by electromagnets.

SUMMARY OF THE INVENTION

A rapid transit system having a concrete trackway with inverted T-shaped slots for receiving inverted T-shaped support members extending downwardly from load carrying pallets. Individually actuated electromagnets are arranged along the trackway in positions to simultaneously support and propel the pallet along the trackway. Additional trackways branch off of the main trackway with electromagnets providing the force to either maintain the pallet on the original trackway or cause it to move onto the branch trackway. A mechanical safety back-up system is also provided to prevent the pallet from becoming lodged in the switch.

A computerized system is additionally provided for monitoring and maintaining the spacing between vehicles, the speed of the vehicles, destination of vehicles, and the re-entry of vehicles into the main stream following a station stop.

The primary object of the invention is to provide a fast, safe rapid transit system in which the cars are supported and propelled by electromagnets in the trackway with actual contact between the vehicle and the stationary trackway kept at a minimum.

Other objects and advantages will become apparent in the following specification when considered in the light of the attached drawings.

BRIEF DESCRIPTION OF THE DRAWINGS

FIG. 1 is a perspective view of the invention shown partially broken away and in section for convenience of illustration;

FIG. 2 is a fragmentary top plan view of one form of switch used with the system;

FIG. 3 is a top plan view of another form of switch used with the system;

FIG. 4 is an enlarged fragmentary transverse sectional view taken along the line 4—4 of FIGS. 2 and 3 looking in the direction of the arrows;

FIG. 5 is an enlarged fragmentary vertical sectional side view taken along the line 5—5 of FIG. 4 looking in the direction of the arrows;

FIG. 10 is a top plan view of a switch used with the system;

FIG. 10A is an enlarged fragmentary transverse cross section taken along the line 10A—10A of FIG. 10 looking in the direction of the arrows;

FIG. 10B is a view similar to 10A taken along the line 10B—10B of FIG. 10 looking in the direction of the arrows;

FIG. 10C is a view similar to 10A taken along the line 10C—10C of FIG. 10 looking in the direction of the arrows;

FIG. 10D is a view similar to FIG. 10A taken along the line 10D—10D of FIG. 10 looking in the direction of the arrows;

FIG. 10E is a view similar to FIG. 10A taken along the line 10E—10E of FIG. 10 looking in the direction of the arrows;

FIG. 10F is a view similar to FIG. 10A taken along the line 10F—10F of FIG. 10 looking in the direction of the arrows;

FIG. 10G is a view similar to FIG. 10A taken along the line 10G—10G of FIG. 10 looking in the direction of the arrows;

FIG. 10H is a view similar to 10A taken along the line 10H—10H of FIG. 10 looking in the direction of the arrows;

FIG. 10 I is a view similar to FIG. 10A taken along the line 10I—10I of FIG. 10 looking in the direction of the arrows;

FIG. 11 is a view similar to FIG. 10E illustrating the operation of the mechanical switching device;

FIG. 12 is a view similar to FIG. 1 of a modified form of the invention;

FIG. 13 is an enlarged fragmentary vertical sectional view of the T member taken along the line 13—13 of FIG. 1 looking in the direction of the arrows;

FIG. 14 is a fragmentary side elevation of an alternate vehicle retaining system for the pallet;

FIG. 30 is a perspective view of one of the system stations shown partially broken away and in section for convenience of illustration; and FIG. 31 is a perspective view of a modified form of pallet to provide a passenger pod.

Referring now to the drawings in detail wherein like reference characters indicate like parts throughout the several figures the reference numeral 40 indicates generally a rapid transit system constructed in accordance with the invention.

Figure 6:
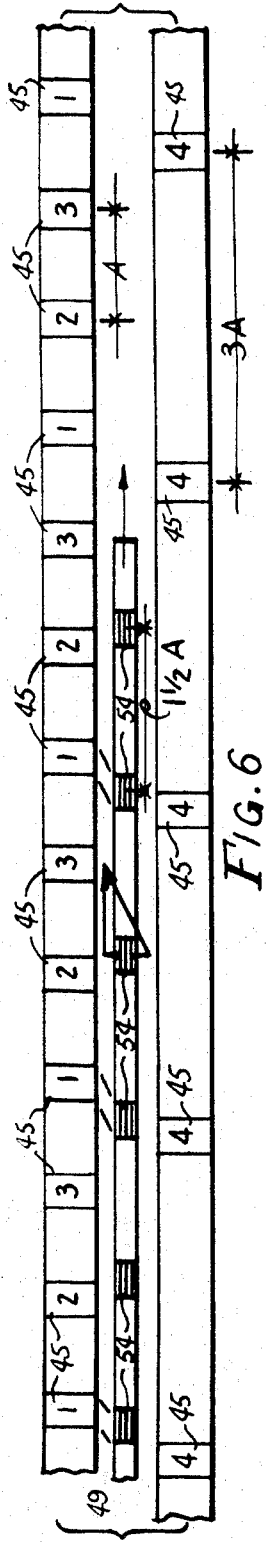
FIGS. 6, 7, 8 and 9 are similar to FIG. 5 and illustrate the magnetic pull during movement of the vehicle in the trackway.
Figure 7:
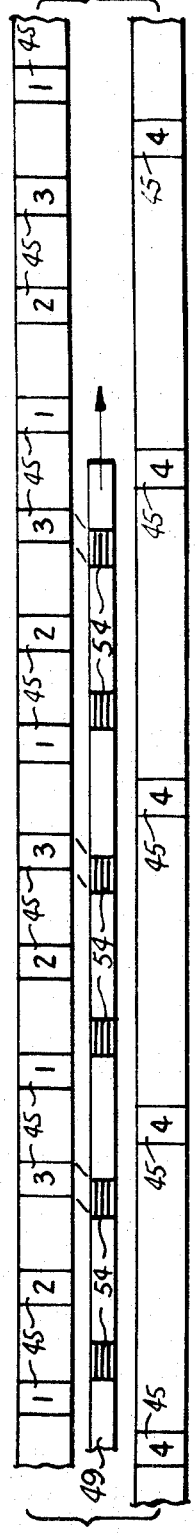
Figure 8:
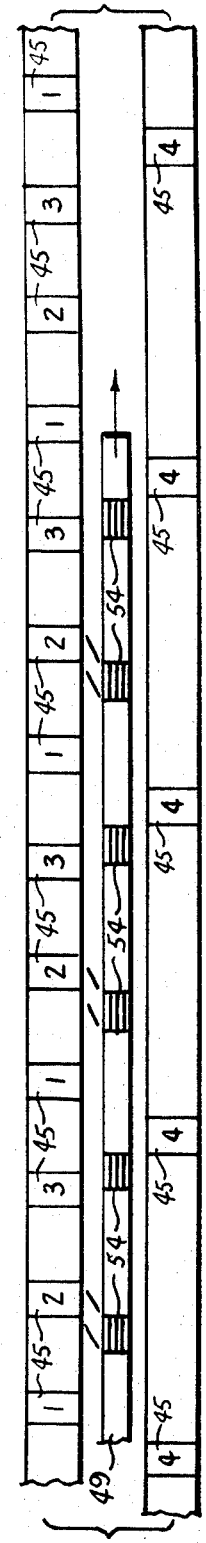
Figure 9:
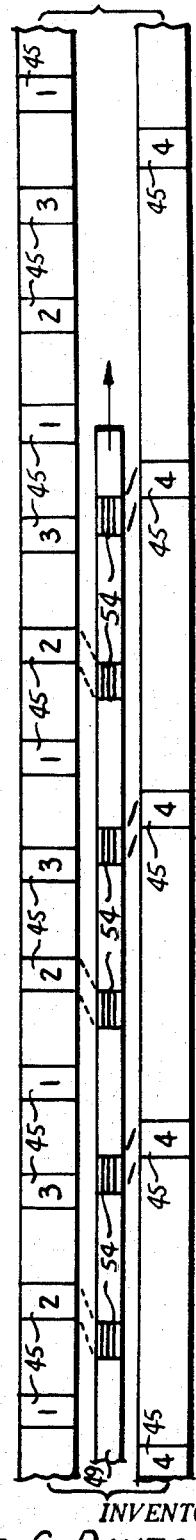

The transit system 40 includes a concrete trackway generally indicated at 41 supported on a plurality of pillars 42 or supported directly on the ground. The trackway 41 has a pair of inverted T shaped slots 43 extending therealong in spaced parallel relation and a vertical slot 44 extending along one side thereof. The inverted T slots 43 have a plurality of electromagnets 45 arranged therealong in longitudinally spaced relation on both the upper and lower surfaces of the T slot 43. The trackway 41 may have any desired switches provided therealong as illustrated in FIGS. 2 and 3 to permit the system to move vehicles to any desired place.

The primary vehicle used with the system is a pallet indicated generally at 46 in FIG. 1. The pallet 46 includes a generally horizontal platform 47 having a pair of spaced parallel vertically depending webs 48 integrally formed thereon. A T head 49 is formed on the lower end of each of the webs 48 to extend through each of the T slots 43. A blade 57 depends from the web 48 and has a relatively sharp lower edge 58. The blade 57 is adapted to travel along the slot 59 for reasons to be assigned.

A vehicle such an automobile 52 is adapted to be supported on the platform 47 and secured in place thereon by holddowns 53. The pallet 46 is formed of magnetically inert material and the T bars 49 are provided with a plurality of soft iron core segments or slugs 54 for cooperation with the electromagnets 45. The core segments or slugs 54 are isolated from one another and form long segmented rows on both sides of the pallet. This configuration is a very important one since it allows the pallet to assume an inert or passive roll. The trackway 40 does the work with the pallet merely following the electromagnetic tug of the trackway. In the present system individual pallets cannot "burn out" to thereby slow down and jam the entire system. In the event that an electromagnet 45 on the trackway burns out its neighbors pick up its load with the pallet gliding over the next units and continuing on its way at the proper speed.

In FIGS. 6 through 9 a diagrammatic illustration shows how the electromagnet fires or turns on when the vehicle counterpart is present beneath it. In these figures the upper electromagnets 45 are numbered 1, 2, 3 — 1, 2, 3 etc. with all 1s adjacent the pallet being switched on together then all 2s together and then all 3s together. The firings are staggered to produce even thrust and to maintain a capability to self-start when needed. The upper electromagnets are fired or turned on in a 1, 3, 2 — 1, 3, 2 order which provides continuously applied forward and upward thrust. Other rows can be staggered horizontally also to effect even smoother forward motion. The coil 45 numbered 4 in FIGS. 6 through 9 is positioned below the T head 49 and is used to pull the pallet 46 downwardly and forwardly as required. If needed, it fires simultaneously with coil No. 2 on the then unused vehicle slugs. Coil 4 balances the pull from coils 1, 2 and 3, to maintain proper height in the roadways, as well as the exact forward speed.

The suspension of the pallet 46 in the system 40 is a nearly free byproduct of the propulsion component. The electromagnets 45 are positioned vertically above the interacting parts of the pallet 46 so that as the electromagnets "tug" the pallet along the road, they also lift the pallet so that it "floats" almost without friction. The pull the electromagnets exert is electronically controlled, to thus maintain the proper height above the trackway 41 lifting the pallet 46 and also holding it from floating too high or too low.

Since the electromagnets are laterally spaced on opposite sides of the pallet and support both sides of the pallet equally, the pallet is stablized in roll. Both sides of the pallet are effectively maintained at the proper height above the trackway. Sidewise guidance is also provided since the electromagnets are employed in an attracting mode, constantly centering the pallet in the trackway, the pallet is prevented from shifting from side to side.

The electrical power is rapidly turned on and off to maintain proper height (as well as speed) and is the composite force of all the electromagnets working together. Each electromagnet operates independently from its neighbor with two exceptions. 1. The firing is synchronized to provide exact forward speed required, and 2, "dump out" or back E.M.F. from a neighbor coil may be utilized, i.e., after a neighbor coil fires, the remaining energy of the collapsing magnetic field is transferred to the appropriate neighbor electromagnet through diode switching.

Each electromagnet has its own electronic control which directs the firing or triggering to turn it on and off.

The basic principle followed in triggering the electromagnets is as follows: A sensor in the trackway detects the presence of a pallet. The sensor is a photo cell or equivalent device. As the pallet's iron core cuts a light beam, it triggers a silicon controlled rectifier utilizing AC electricity to turn on a switch. This permits DC electric current flow into the electromagnets to thus pull the pallet forward and upward. Other sensors spaced along the trackway detect height of the pallet, and control current to the electromagnets above or below, as required, to main height and speed. An outside generated common synchronizing pulse is compared to the sensor generated signal to determine whether or not the pallet is at proper speed and to give a standard reference as a guide to match the speed of the pallet to the desired speed. Passage of the pallet to a position where an individual electromagnet can no longer pull the vehicle forward is detected by the sensors and the electric current to that electromagnet is then shut off. This cycle is repeated continuously to move the pallet along the trackway.

The basic trackway of the system is a pre-stressed concrete beam, suspended between pillars in the ground. The beams are linked together end to end to form a continuous elevated trackway. The pallets are constrained to the trackway at all times with an inverted T configuration on each side of the trackway. The inverted T configuration serves several purposes, it constrains the pallet positively to the trackway, it permits rapid switching on and off the trackway, and it permits the drive system to be placed beneath the pallet.

In addition, the system is of particular use in tunnels because no pollutents are produced. In congested areas the system may be more conveniently used underground due to the absence of pollutents.

Figure 22:
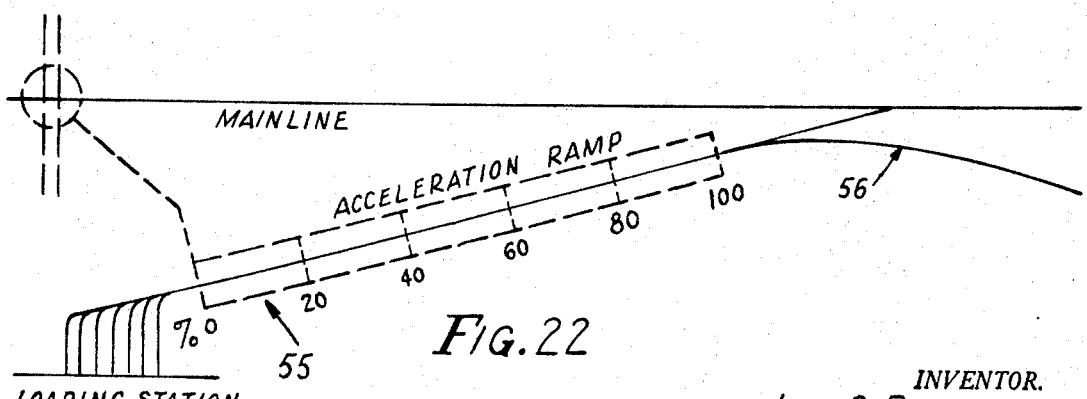
FIG. 22 is a semi-diagrammatic view of a loading station and acceleration ramp leading to the main line of the system.

In order to obtain the maximum efficiency from the system, pallets use the main line at top speed. Thus the main line traffic travels at synchronous speed, with all traffic moving at the same speed, determined by the synchronous pulse used to fire the electromagnets and the frequency of the power supplied to the system. The trackway automatically compensates for each pallet's weight and air drag and locks the pallet in step with the system speed. To get into the system which operates at one synchronous speed, a pallet is first accelerated on a siding or acceleration ramp indicated generally at 55 in FIG. 22 until it reaches the main line velocity. Then, if everything is right, the pallet is switched into the main line without disturbing the flow of traffic therein.

Initiation of acceleration depends upon hitting an open hole or spot without traffic on the main line and thus timing of initiation of acceleration is used to position the pallet into main line traffic.

Normally the acceleration ramps will develop more than enough power to accelerate all vehicles to main line speed, however, an escape route generally indicated at 56 will extend from the end of each of the accelerated ramps 55 to accept any pallet that did not get up to speed as required, or that should not enter the main line due to close proximity of other pallets already on the main line.

Similarly pallets to be removed from the system are first switched from the main line to a siding and are then de-accelerated to a stop in a station. No starting or stopping or slowing down is executed on the main line except in cases of emergency such as fire, flood or the like.

In the system, each station is represented a code number, similar to a zip code number. A coded plate attached to the side of each pallet carries the assigned destination station of that pallet as well as information on the type of pallet. The code is either carried visually, or by magnetic pattern on the plate. A reader device at each switch along the main line reads the destination information on the side of each vehicle as it approaches the switch and this information determines which way the vehicle should be switched as it proceeds on its trip. Thus, every time a vehicle approaches a switch, a decision is made by the reader and a simple computer as to the correct branch of the roadway required for the pallet to travel to get to its final destination. If the pallet has already passed its destination, but could not stop there because of a local overload or for some other unforeseen event, the vehicle is then removed from the system at the next available station.

If it become desirable to leave the system, as in the event of a passenger's personal requirement or the like, all that is required would be to turn on the headlights of the automobile, in the case of auto-ferrying, and the vehicle could be removed from the system at the next available station. The headlights of the auto are detectable by a trackside photocell which in turn directs the switch to remove the vehicle from the main line. Similarly, the destination other than scheduled of the other types of pallets can be altered as required.

A central computer monitors all traffic flow at all times to watch the system. Thus, all pallets in the system are watched to insure safe arrival at their destination. The position of any pallet is known at all times so that any pallet can be intercepted at any time as required. In the event of a disaster such as an airplane crashing on the trackway, an immediate shutdown of the system would be initiated.

In FIG. 10 and the cross sections taken therealong a specific switch for the trackway 41 is illustrated. In FIG. 10A the web 48 carries the T bar 49 on its lower end and has a blade 57 projecting downwardly therefrom terminating in a sharpened longitudinal edge 58. The trackway slot 43 includes a lower extension 59 to receive the blade 57. As the switch indicated generally at 60 is approached the slot 43 including the lower extension 59 widens to permit the web 48 and the T bar 49 to move laterally so that the pallet 46 can move into the branch track as the magnetic forces so direct. As the groove 43 and its lower extension 59 become wider a blade 61 is mounted centrally on the bottom of the lower extension 59 extending longitudinally therealong with a sharpened upper edge 62. The sharpened edges 58 of the blade 57 and the sharpened edge 62 of the blade 61 are incompatible and the blade 57 is forced to travel one side or the other of the blade 61. Magnetic forces normally urge the pallet 46 to one side or the other at the switch with the blade 57 and blade 61 providing a mechanical separation in the event of electrical failure at the moment when a switch or non-switch actuation of the magnets is required. Switches 60 are similar in construction.

The switching mechanism in the system is extremely important due to the fast reaction time required. With the switch 60 it is possible to have three or more pallets running virtually in contact at high speed and to safely remove any one of the pallets from the trackway without effecting the others.

In the form of the invention illustrated in FIG. 12 the blade 50 running in the groove 44 is substituted for the blade 57 running in the lower extension 59 of the groove 43. The operation of the blade 50 is identical to that of the blade 57 the only difference being the location on the pallet 46.

The system is specifically designed around the concept of ferrying a standard automobile. It is intended that a standard automobile can be driven onto a pallet 46, secured to the pallet, and then travel in the system any place the system operates. There are many advantages in so doing. People can quickly travel from one side of town to the other at a high rate of speed and then have their automobile available to move on to their final destination.

Automobiles can be ferried with or without people and independently from any other system traffic. Remote automatic parking is also practical with the system. A low overhead area out of town can be set aside as a large automatic parking area. After stopping at a station, if the station happens to be near the destination the passenger can walk to, the car could be sent to the out-of-town parking lot by itself and be delivered back upon request to any station at a high rate of speed. A phone call could initiate delivery with rental or lease automobiles also available through the same system. Loading of the standard automobile onto the pallets can be accomplished on a semiautomatic basis with a single observer controlling the loading operation. Automobiles will be manually driven into a curbed lane onto the pallet and connected thereto automatically. Any desired method for securing the automobile to the pallet may be used with a particular structure being illustrated in FIGS. 14, 27, 28 and 29. In FIG. 14 the automobile 63 is positioned on the pallet 46 and is gripped by clamps generally indicated at 64 both front and rear. The clamps 64 have a pair of upright posts 65 carrying a pivoted rubber block 66 thereon. A brace 67 is pivotally secured to the upper end of the post 65 and a holddown member 68 is similarly pivoted to the post 65 to overhang the trunk and hood of the automobile 63 to prevent its dislodgment. A power system 69 in the pallet 46 is provided for spreading the bottom of the post 65 and the bottom of the brace 67 to lower the clamp 64 into the pallet 46 to permit the automobile 63 to be driven therefrom. A reverse operation of the power system 69 erects the clamp 64 in the position illustrated in FIG. 14 to clamp the vehicle 63 on the pallet 46.

The system may have any type modules desired operating on the same principle and carried by pallets 46. The modules may include relatively small passenger pods which give personalized service to any desired station bypassing all other stations or may be of a larger size which stop at regular stops on the system. Obviously freight and mail service pods can also be used on pallets as desired.

Figure 25:
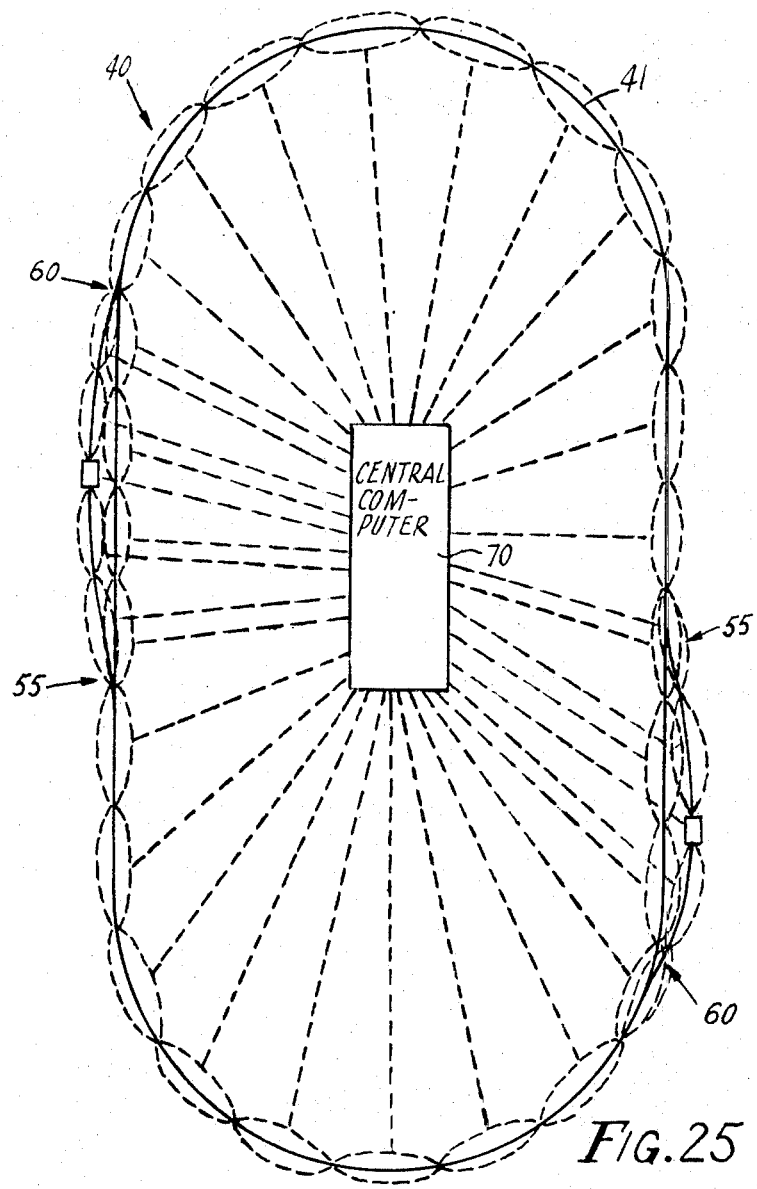
FIG. 25 is a semi-diagrammatic view of a complete system with central computer control.

FIG. 25 illustrates diagrammatically how the system 40 utilizes a trackway 41 controlled from a central computer 70. Considering that the system is operating counterclockwise switches generally indicated at 60 permit pallets to leave the main line for station stops while acceleration ramps 55 permit the pallets to reenter the system.

Figure 15:
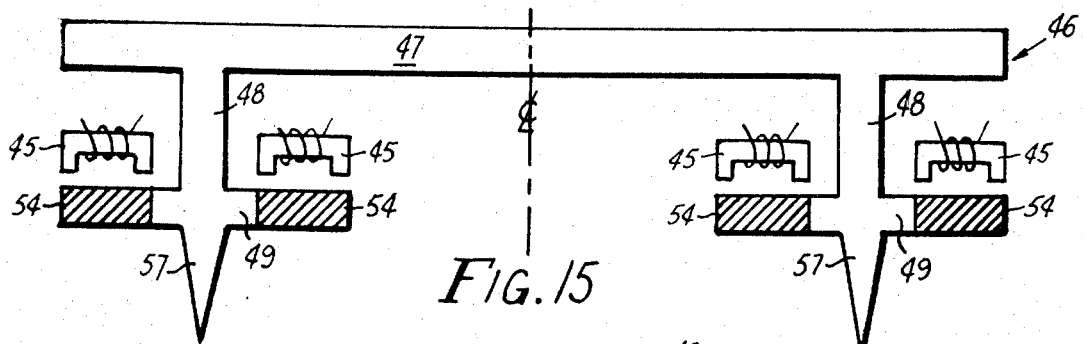
FIG. 15 is a semi-diagrammatic view illustrating the magnets supporting the pallet in central position.
Figure 16:
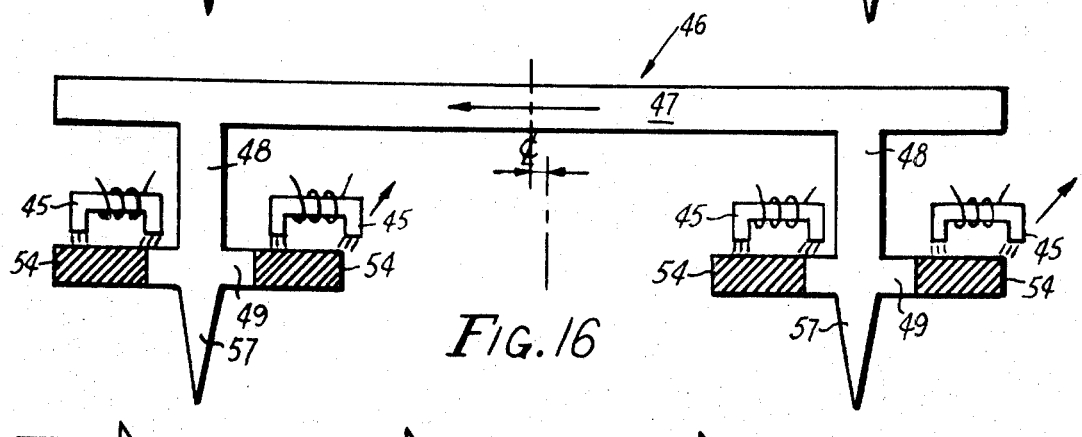
FIG. 16 is a semi-diagrammatic view of the magnets returning the pallet to central position after centrifugal force, wind, etc., has moved it out of central position.

FIGS. 15 and 16 illustrate the centering of the pallet along the trackway. Guidance of the pallet is provided not only by the shape of the trackway itself but also by the fact that the electromagnets are used in an attracting mode. The electromagnets firing on both sides of the pallet can cause the pallet to be constantly pulled towards the center of the trackway and therefore prevent the pallet from physically touching the trackway. For example if the vehicle were to be blown by wind away from the center of the trackway, the electromagnets would attract it back toward the center of the trackway as can be seen in FIG. 16.

Figure 17:
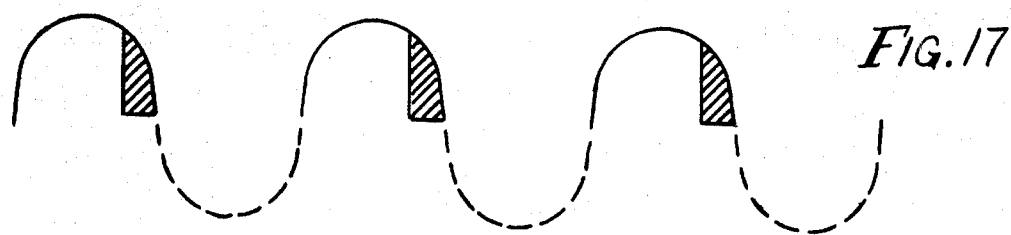
FIGS. 17, 18 and 19 are semi-diagrammatic views illustrating the wave form of the electric power supplied to the electromagnets used in the system.
Figure 18:
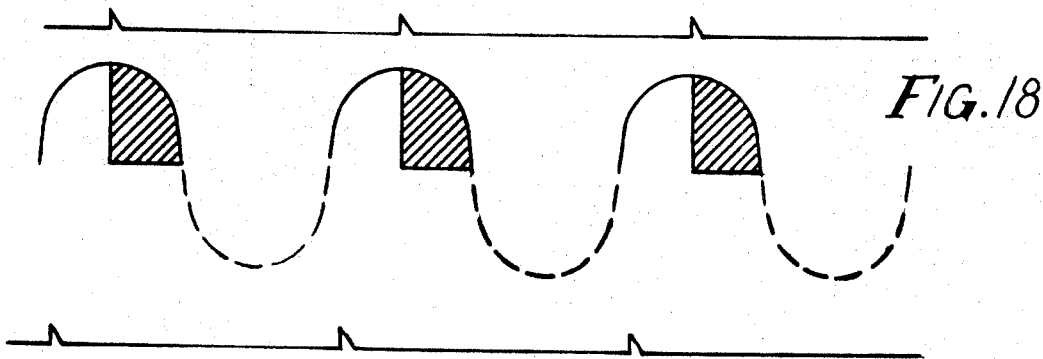

The main line portion of the trackway is designed to maintain any pallet at the exact trackway synchronized speed. The physical or mechanical placement of the electromagnets along the trackway is in phase with the applied power electromagnetic wave form illustrated in FIGS. 17, 18 and 19, and also in phase with the speed of the vehicle on the main line trackway. The physical location of the electromagnets is such that the pallet will arrive at a given point the same instant the start of the phase of 60 cycle wave form from the applied electric power will arrive at the same point. In order to accomplish this the electromagnetic coils are turned on and off with silicon control rectifiers. A silicon control rectifier can be fired at any point relative to start of the input power wave form. Hence, whatever amount of power is required by each pallet can be selected as a function of the required area under the curve of a given power supply wave form. Silicon control recitifers chop the electrical power wave form and give total power or less total power as required to maintain the pallet at synchronous speed (again see FIGS. 17, 18 and 19). FIG. 18 represents the normal operating mode of the pallet with the average power being applied to maintain a normal constant speed. If the pallet were to pick up too much speed and start to run faster, it would get ahead of this wave form as illustrated in FIG. 17 which shows the silicon control rectifiers turning on a little later in the power curve with the resulting reduction in total power to the pallet. Its power level is reduced by the fact that it is arriving at the firing point before the wave form of the AC current, hence the silicon control rectifier fires at a proportionately reduced power level.

Figure 19:
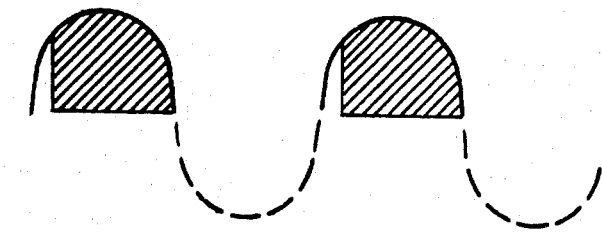

Thus the pallet power is reduced to the point where it would fall back into its normal operating mode as shown in FIG. 18. If the pallet were to slow down below the desired speed, it would get even more power as illustrated in FIG. 19. The total power that is applied to the pallet is the amount required to maintain exact synchronous speed. Thus each pallet seeks its own power level to maintain the same synchronous speed despite limited differences in the amount of drag or load.

The trackway compensates for each pallet's weight and drag by being able to independently suspend any pallet (within certain maximum weight limitations) at a specific height above the trackway and it electronically compensates as required to hold the pallet at this specific height. The 1, 2, 3 magnets in FIGS. 6 through 9 pull the vehicle forward and up and the 4 magnets are designed to pull the vehicle down and forward. The electromagnets being varied in force as required to produce the exact forward speed required, the trackway is then able to maintain the correct height of the vehicle by varying the force of the electromagnets and alternately firing up electromagnets 1, 2 or 3 or electromagnets 4 as required to regulate height. The electromagnets fire in such a way that if a load is raised too high, then the electromagnets on the bottom fire to pull the vehicle down. If the vehicle gets too low only the upper electromagnets fire until the vehicle resumes a centered position. Thus, the electromagnets are able to maintain the proper vehicle height above the trackway.

Figure 20:
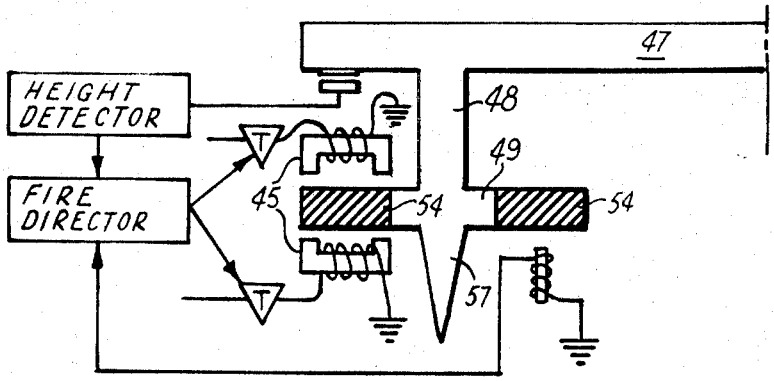
FIG. 20 is a fragmentary vertical sectional view illustrating the basic control of the electromagnets by passing of the pallet.
Figure 21:
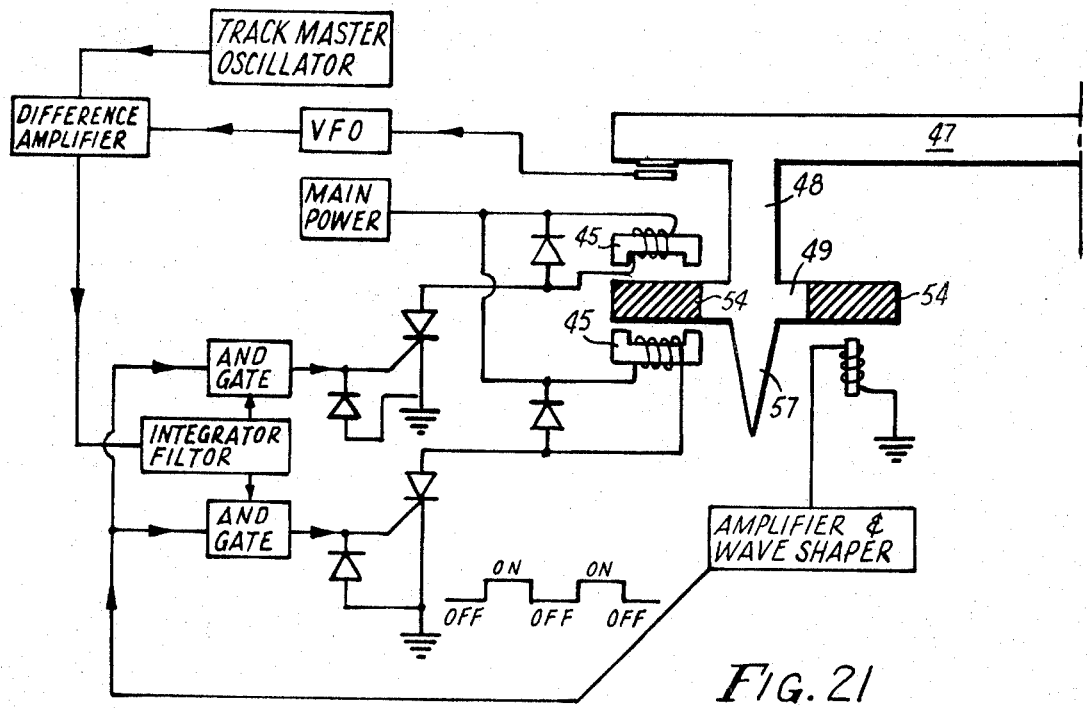
FIG. 21 is a view similar to FIG. 20 with further details of the electronic control system of the electromagnets.

FIG. 20 illustrates the height detector and fire detector relationships with their circuitry for controlling the electromagnets 45. FIG. 21 illustrates diagrammatically the electrical circuitry for turning the electromagnets on and off to control the progress and height of the pallet with respect to the trackway.

Figure 23:
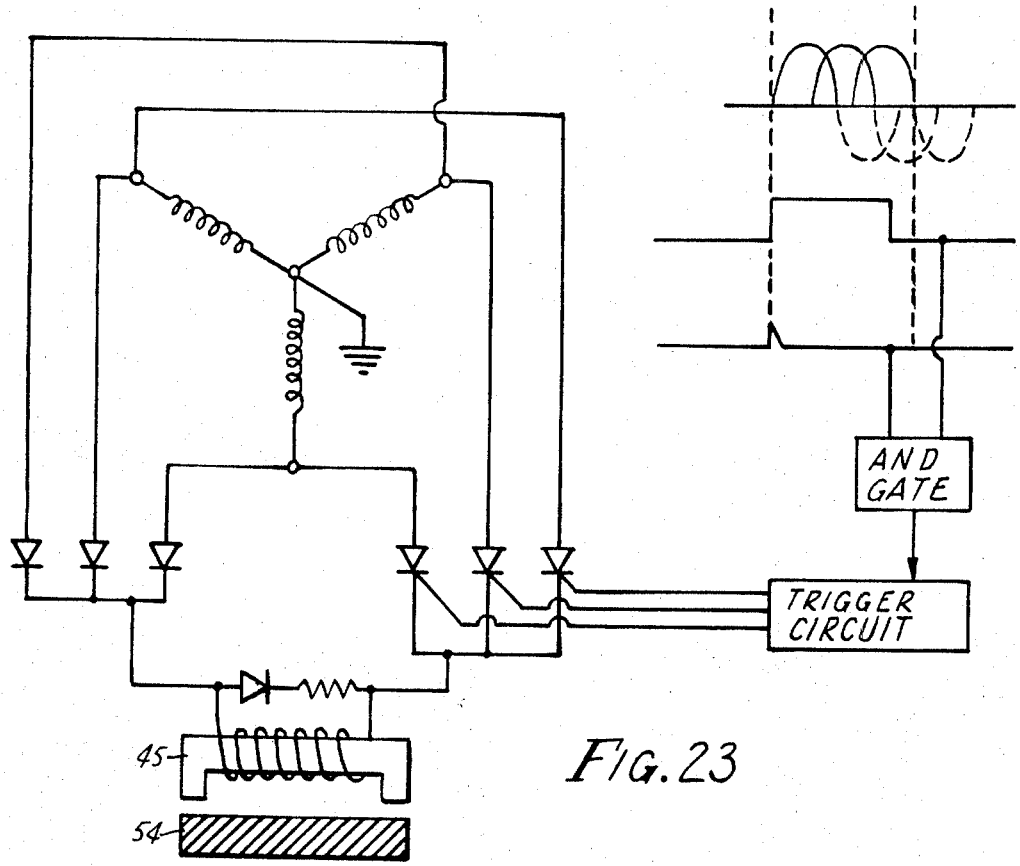
FIG. 23 is a wiring diagram of the acceleration circuit for the electromagnets used in the system.

FIG. 23 illustrates the accelerator electromagnetic circuitry used in the acceleration 55. Acceleration is done uniformly and smoothly so as to provide maximum comfort to the passengers. Acceleration to main line speed requires a set amount of time and this time lag is accounted for in timing the initiation of acceleration to hit an open space in the main line flow. A variable frequency oscillator continually sweeps from 0 to maximum speed at the desired acceleration rate. This VFO output establishes the maximum acceleration speed the vehicle can go, because the VFO output is put into an "and" gate which requires two inputs to allow the electromagnets to fire, one signal from the VFO and another from the pallet. If a pallet arrives before the VFO, firing is held up until the VFO signal arrives, thus holding the maximum speed of the pallet to the speed of the VFO. FIG. 23 illustrates a three phase electronic switch which phasing is unimportant as it can turn on and off at any time, thus power can be supplied as required. In other words it provides essentially a DC switch to fire as rapidly as the vehicle requires. Utilizing this system the car is self accelerating after initiation but top speed is restrained by the VFO.

Figure 24:
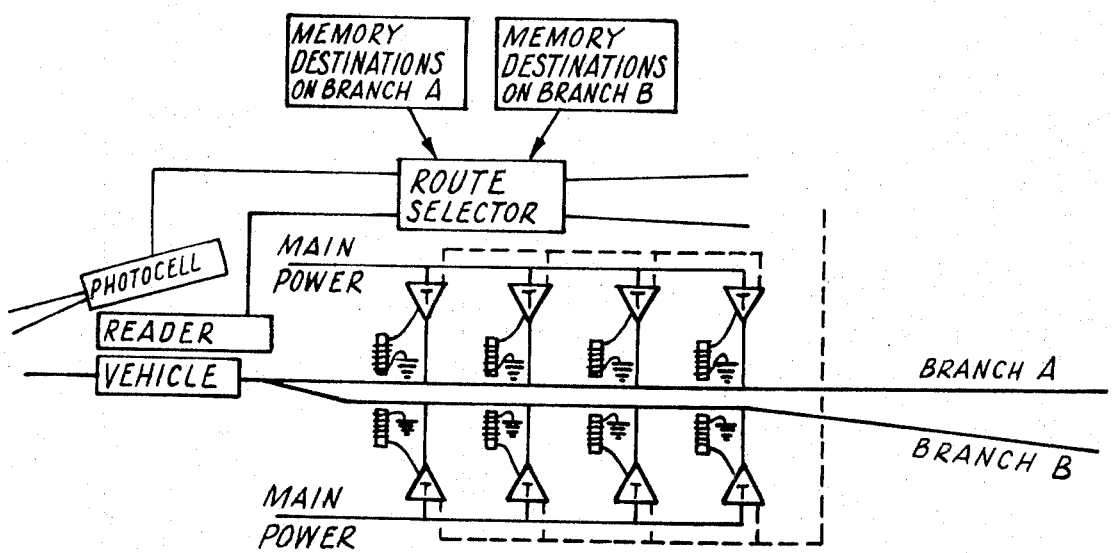
FIG. 24 is a semi-diagrammatic view of a direction control for the pallet at a branch line.
Figure 26:
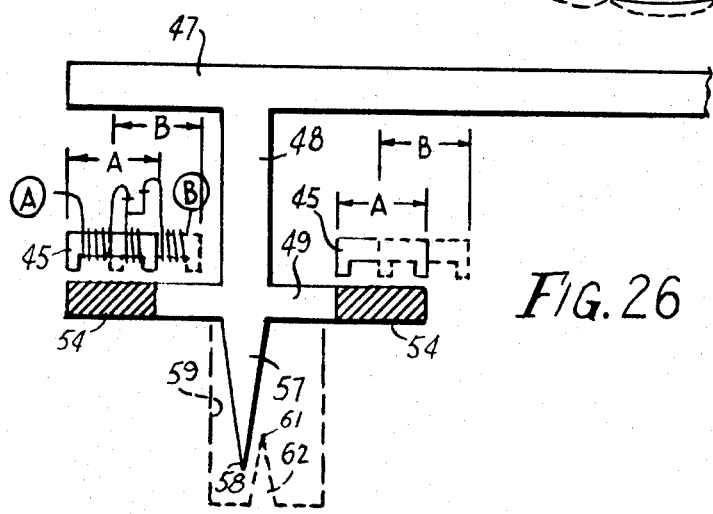
FIG. 26 is a view similar to FIGS. 15 and 16 of another electromagnetic control to effect vehicle switching.
Figure 27:
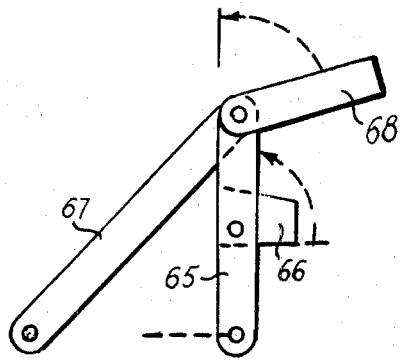
FIG. 27 is a side elevation of the mechanical linkage for securing a car on a pallet.
Figure 28:
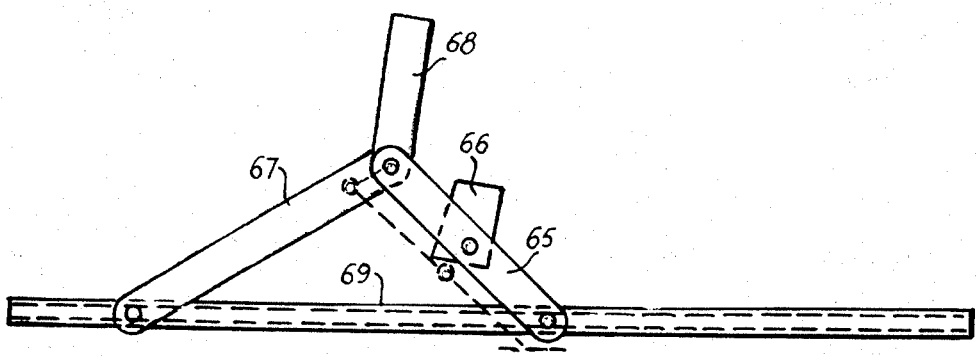
FIG. 28 is a view similar to FIG. 27 with the linkage in a second position.
Figure 29:
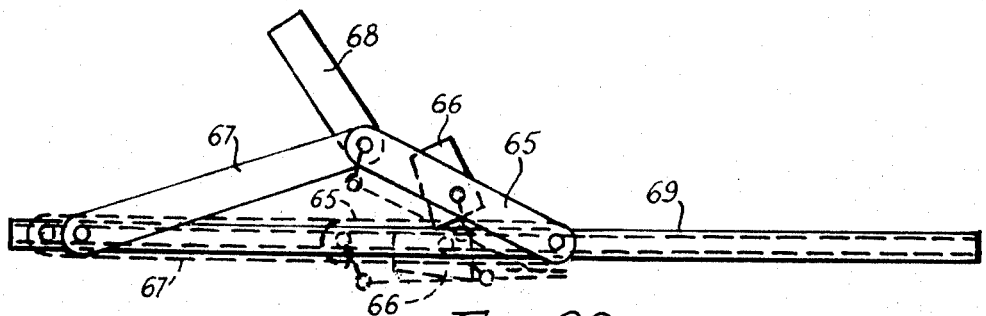
FIG. 29 is a view similar to FIG. 27 with the linkage in a third position.

Each station along the trackway is represented by a code number similar to a postal zip code number which identifies the station. Each pallet carries its destination in the form of a magnetic code on the strip which is attached to the side of the pallet. In FIG. 24 the circuitry for controlling the entrance for a branch line at a switch is illustrated. First a reader determines which way the vehicle is to be switched in the system, (branch A or branch B). Branch A could represent the main line with branch B being a typical off loading ramp with de-acceleration into an off loading station. A magnetic tape reader reads the magnetic tape or strip on the side of the pallet and transfers this information to a route selector. The route selector decides whether branch A or branch B should be used by the vehicle and fires the appropriate electromagnets for pulling the vehicle to the left or right as required to accomplish the switching action. (See FIG. 26). The design of switching magnets allows the vehicle to maintain a guidance in the appropriate center of each branch while it is being switched so that the vehicle is not violently pushed to one side or the other against the wall but is appropriately guided into the center of each branch.

In FIG. 30 a typical station installation indicated generally at 70 is provided for loading automobiles onto the pallets.

The station 70 includes an elongate pit 71 having transverse tracks 72 extending thereacross and carrying jack carts 73. The jack carts 73 are supported on a plurality of flanged wheels 74 engaged with the tracks 72. A hydraulic ram 75 is connected to the jack carts 73 to move them transversely of the pit 71. Hydraulic jacks 76 are carried by the jack carts 73 and support at their upper ends a trackway body 77. The trackway body 77 has a T-shaped slot 78 on one side and a T-shaped slot 79 on the other side with the slots 79 having a lower extension 80 forming a part thereof. The pallet 47 is supported on webs 48 having T-bars 49 integrally formed thereon for engagement in the T-shaped slots 78, 79. The pallet 47 has a plurality of holddown members 53 secured thereto for holding an automobile in place on the pallet platform 47. A channel track 81 is positioned to support the tires on one side of the automobile and a second channel track 82 is adjustably positioned to support the tires on the opposite side of the automobile.

In the use and operation of the station 70 the automobile is driven on channel track members 81, 82 and a pallet 47 is moved into correct position controlled by contact switches on track members 81 and 82. The securing members 53 are then actuated to lock the vehicle to the pallet 47 so that as the pallet 47 moves out the vehicle locked to the securing members 53 similar to a ball-lock pin device moves therewith with the tires lifting off of the channel tracks 81, 82.

The lateral adjustment of the trackway 77 by the hydraulic cylinder 75 is provided so that the pallet 47 may be centrally positioned beneath the vehicle supported in the channel trackways 81, 82. Vehicles vary in width from relatively narrow foreign automobiles to relatively wide trucks. The channel trackways 81, 82 are adapted to be adjusted to support the tires of any desired road vehicle.

In FIG. 31 the conventional trackway 41 is illustrated supporting a passenger car 83 which has the pallet 46 incorporated therein forming a part thereof. The passenger car 83 may be of any desired length and may have seats provided for any desired number of passengers.

Having thus described the preferred embodiments of the invention it should be understood that numerous structural modifications and adaptations may be resorted to without departing from the spirit of the invention.

I claim:

1. A rapid transit system comprising a trackway formed of solid material and having at least a pair of spaced apart parallel T-shaped slots formed therein, a plurality of electromagnets mounted in said trackway along said slots, a pallet positioned above said trackway, at least a pair of webs extending downwardly from said pallet into said T-shaped slots, a T bar integrally formed on the lower end of said webs, means for individually and progressively energizing the electromagnets in said trackway to exert electromotive force on said T bars to raise said pallet and propel said pallet along said trackway.

2. A device as claimed in claim 1 wherein the electromagnets are positioned above and below said T bar for balancing the magnetic loads thereon.

3. A device as claimed in claim 1 wherein means are provided in said system for moving a pallet off of said system as desired.

4. A device as claimed in claim 1 wherein electromagnetic and mechanical switching means is provided in said trackway and on said pallet for switching said pallet to a branch line as desired.

5. A device as claimed in claim 1 wherein said pallet is provided with means for supporting a motor vehicle thereon.

6. A device as claimed in claim 1 wherein said pallet is provided with means for supporting a passenger pod thereon.

7. A device as claimed in claim 1 wherein means are provided in said system for individually and successively energizing said electromagnets for controlling the position, speed and height of the pallets moving in said system.

8. A device as claimed in claim 7 wherein a plurality of branch lines are provided in said system with each of said branch lines having a switch through which the pallet moves controlled by a plurality of electric magnets in said trackway in said switch.

9. A device as claimed in claim 8 wherein stationary mechanical means are provided for guiding said pallet through said switch to remain in said trackway or to move into said branch line.

10. A device as claimed in claim 1 wherein a passenger carrying pod is secured to said pallet for movement therewith.

11. A device as claimed in claim 1 wherein a freight carrying pod is secured to said pallet for movement therewith.

12. A device as claimed in claim 1 wherein the electric magnets in said slot along said trackway are positioned above and below said slots and along each side of said slots for controlling the position of the pallet with respect to said trackway.

13. A device as claimed in claim 1 wherein means are provided for guiding a motor vehicle onto a pallet and additional means are provided for centering the pallet beneath said motor vehicle.

\* \* \* \* \*

UNITED STATES PATENT OFFICE
CERTIFICATE OF CORRECTION

Patent No. 3,750,803   Dated August 7, 1973

Inventor(s) Lee C. Paxton

It is certified that error appears in the above-identified patent and that said Letters Patent are hereby corrected as shown below:

Patentee's address should read

-- 5050 North Avenue

Carmichael, California 95608 --.

Signed and sealed this 17th day of September 1974.

(SEAL)
Attest:

McCOY M. GIBSON JR.
Attesting Officer

C. MARSHALL DANN
Commissioner of Patents